United States Patent
Savage et al.

(10) Patent No.: US 9,473,018 B2
(45) Date of Patent: Oct. 18, 2016

(54) HIGH EFFICIENCY VOLTAGE LEVEL MULTIPLIER

(71) Applicant: Broadcom Corporation, Irvine, CA (US)

(72) Inventors: Scott Savage, Fort Collins, CO (US); Stephen Greenwood, Fort Collins, CO (US); Christopher Ward, Amsterdam (NL); Josh Crohn, Chandler, AZ (US)

(73) Assignee: BROADCOM CORPORATION, Irvine, CA (US)

( * ) Notice: Subject to any disclaimer, the term of this patent is extended or adjusted under 35 U.S.C. 154(b) by 4 days.

(21) Appl. No.: 14/319,958

(22) Filed: Jun. 30, 2014

(65) Prior Publication Data

US 2015/0326111 A1    Nov. 12, 2015

Related U.S. Application Data

(60) Provisional application No. 61/990,088, filed on May 7, 2014.

(51) Int. Cl.
*H03L 5/00* (2006.01)
*H02M 3/06* (2006.01)
*H02M 3/155* (2006.01)

(52) U.S. Cl.
CPC ............... *H02M 3/06* (2013.01); *H02M 3/155* (2013.01)

(58) Field of Classification Search
CPC ................................ H02M 3/06; H02M 3/155

USPC ....................................... 327/536; 363/59, 60
See application file for complete search history.

(56) References Cited

U.S. PATENT DOCUMENTS

| | | | | | |
|---|---|---|---|---|---|
| 4,000,412 | A * | 12/1976 | Rosenthal | ............... | H02M 3/07 327/180 |
| 5,650,742 | A * | 7/1997 | Hirano | ............. | H03K 19/01852 326/81 |
| 6,356,137 | B1 * | 3/2002 | Roohparvar | ........... | G11O 5/145 327/390 |
| 6,781,440 | B2 * | 8/2004 | Huang | .................. | H02M 3/073 327/536 |
| 7,256,642 | B2 * | 8/2007 | Kimura | ................. | H02M 3/073 327/536 |
| 7,629,831 | B1 * | 12/2009 | Perisetty | ............... | H02M 3/073 327/536 |
| 7,994,843 | B2 * | 8/2011 | Ogawa | .................... | H02M 3/07 323/222 |

* cited by examiner

*Primary Examiner* — Kenneth B Wells
(74) *Attorney, Agent, or Firm* — Foley & Lardner LLP (57) ABSTRACT

A voltage multiplier circuit. The voltage multiplier circuit includes a storage element, a first transistor, a second transistor and third transistor. The storage element has a first end and a second end. The second end is coupled to a clock signal input. The first transistor has a gate coupled to a voltage node, a first terminal coupled to a supply node, and a second terminal coupled to the first end of the storage element. A second transistor has a first terminal coupled to the first end of the storage element and a second terminal coupled to the voltage output. The third transistor has a gate in communication with the clock input and a first terminal coupled to the voltage node.

20 Claims, 4 Drawing Sheets

HIGH EFFICIENCY VOLTAGE LEVEL MULTIPLIER

CROSS-REFERENCE TO RELATED APPLICATION

This application claims the benefit of and priority to U.S. Provisional Application No. 61/990,088, filed May 7, 2014, entitled "HIGH EFFICIENCY VOLTAGE LEVEL MULTIPLIER", assigned to the assignee of this application, and which is hereby incorporated by reference herein in its entirety for all purposes.

FIELD OF THE DISCLOSURE

This disclosure generally relates to systems and methods for providing voltage signals. In particular, this disclosure relates to systems and methods for voltage multiplication, including but not limited to voltage doubling.

BACKGROUND OF THE DISCLOSURE

In the last few decades, the market for wireless communication, sensing and computing devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made electronic equipment smaller, cheaper, and more reliable. Electronic circuits associated with communication, sensing and computing devices as well as other electronic devices can utilize voltage signals at levels greater than a supply voltage level. Voltage multipliers, such as voltage doublers, can provide voltage signals at voltage levels greater than the supply voltage level.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION OF EMBODIMENTS

Described herein with reference to FIGS. 1-7 are systems and methods for providing a signal at a voltage level different than (e.g., above) a source voltage level, such as a power source level. Such systems and methods can be used in virtually any application that uses or can benefit from a signal having a voltage level different than the voltage level provided by the power supply or a power node. Applications include but are not limited to communication, sensing, computing or other electronic applications.

In certain embodiments, the systems and methods described herein can be utilized in circuitry for any communication, sensing, or computing device. In certain embodiments, voltage level multiplication (e.g., voltage doubling) can be used in power supplies or sources for precision data converters (e.g., analog-digital converters (ADCs) used in mobile applications), in power supplies or sources intended for thin-oxide field effect transistors (FETs) that supply power for circuits using one or more thick-oxide FETs, in low leakage in applications using a high on-resistance ($R_{ON}$) to off-resistance ($R_{OFF}$) ratio switch operating at a voltage near mid-rail, in circuitry that uses low leakage, low power switches, in succession approximation register (SAR) ADCs that uses switching near a supply rail, or in other circuitry that uses a voltage level above a supply level.

In one embodiment, a voltage multiplier can be embodied as a voltage doubler. The voltage multiplier can provide a doubled or near doubled voltage level from a supply voltage level (e.g., $V_{DD}$) in one embodiment. The doubled or near doubled voltage (e.g. ~2 $V_{DD}$) can be provided for periods of time on a reoccurring basis.

The voltage doubler can be used to drive a capacitive load at a voltage level approaching a voltage of twice the supply voltage in one embodiment. Although the terms voltage doubling and voltage doubler are used herein, the claims of the present application are not limited to voltage doubling or voltage doublers. The system and method can provide other levels of increased voltage levels without departing from the scope of the invention (e.g., by a factor of more than two, less than two, etc.).

In one embodiment, a voltage multiplier circuit or voltage doubler circuit includes an input capacitor and transistors or other switches arranged to effect voltage doubling for a capacitive load. A transistor between the input capacitor and the capacitive load is modulated by using the signal swing between the input capacitor and the capacitive load in one embodiment. In another embodiment, the transistor between the input capacitor and the capacitive load is driven at its gate with an inverted clock signal so that its gate overdrive has a larger excursion. The use of the transistor between the input capacitor and capacitive load allows a higher peak output voltage to be driven in one embodiment. Lower voltage drops are achieved using the transistor between the input capacitor and the capacitive load compared to two terminal devices (e.g., diodes) in one embodiment. This advantage is pronounced in low voltage circuits (e.g., circuits powered by a 1-1.5 Volt (V) or less power supply). In addition, the voltage doubler can use switched transistors to force the input capacitor and the capacitive load to known states in response to a clock signal for repeatable operation during each cycle in one embodiment.

In one embodiment, transistors in a voltage doubler or voltage multiplier can share a common well or be disposed in separate wells at the same potential. A transistor can be provided to bias the common well in one embodiment. The transistor can bias the common well to a voltage above the source or supply voltage in one embodiment. In one embodiment, a separate source can bias the well. In one embodiment, the common well can float.

In one embodiment, a transistor between the voltage source and the input capacitor can provide a break before make circuit. The break before make circuit reduces charge lost from the input capacitor in one embodiment.

With a reasonable capacitive load, a simulated output of the voltage multiplier provides a 2.6 V output voltage level based upon 1.45 volt logic supply or a 1.7 V output voltage level based upon 1 volt logic supply in certain embodiments. The values above are listed in an exemplary fashion. Using the voltage doubler allows the use of thick-oxide switches without an additional supply in one embodiment.

Certain embodiments of a voltage doubler or voltage multiplier circuit can provide a number of advantages. The advantages can include one or more of: 1. for charge storage voltage applications, a reduced capacitor voltage droop due to leakage; 2. for resistor ladder tap applications, a reduced leakage-induced variation of a tap voltage; 3. for multiplexing applications with high source resistances, reduced leakage-induced errors; 4. higher switch overdrive which allows for smaller switches, improving area, power efficiency, and parasitic capacitance; and/or 5. the ability to drive a switch near mid-supply with high on resistance and off resistance ratio and lower capacitance, power and area requirements. The advantages discussed above are not provided in a limiting fashion. The voltage multipliers and methods of voltage multiplication may or may not achieve one or more of the advantages discussed above without departing from the scope of the claims.

One embodiment relates to a voltage multiplier circuit. The voltage multiplier circuit includes a storage element, a first transistor, a second transistor and third transistor. The storage element has a first end and a second end. The second end is in communication with a clock signal input. The first transistor has a gate coupled to a voltage node, a first terminal coupled to a supply node, and a second terminal coupled to the first end of the storage element. A second transistor has a first terminal coupled to the first end of the storage element and a second terminal coupled to the voltage output. The third transistor has a gate in communication with the clock input and a first terminal coupled to the voltage node.

Another embodiment relates to a method of increasing a voltage level. The method includes charging a capacitor having a first end coupled to a first node, raising a voltage at a second end of the capacitor to provide a voltage level at the first node above a supply node, and providing current from the capacitor through a first transistor to a voltage output. The method also includes preventing the current from the capacitor from traveling through the first transistor to the voltage output, and providing current through a second transistor having a first terminal coupled to the supply node to charge the capacitor.

Another embodiment relates to a voltage doubler. The voltage doubler includes a storage capacitor disposed between a clock input and a first node, and a first switch disposed between a supply node and the first node. The first switch has a control input in communication with a voltage output. The voltage doubler also includes a second switch disposed between the first node and a voltage output, and a third switch disposed between the control input of the first switch and a ground node.

Figure 1:
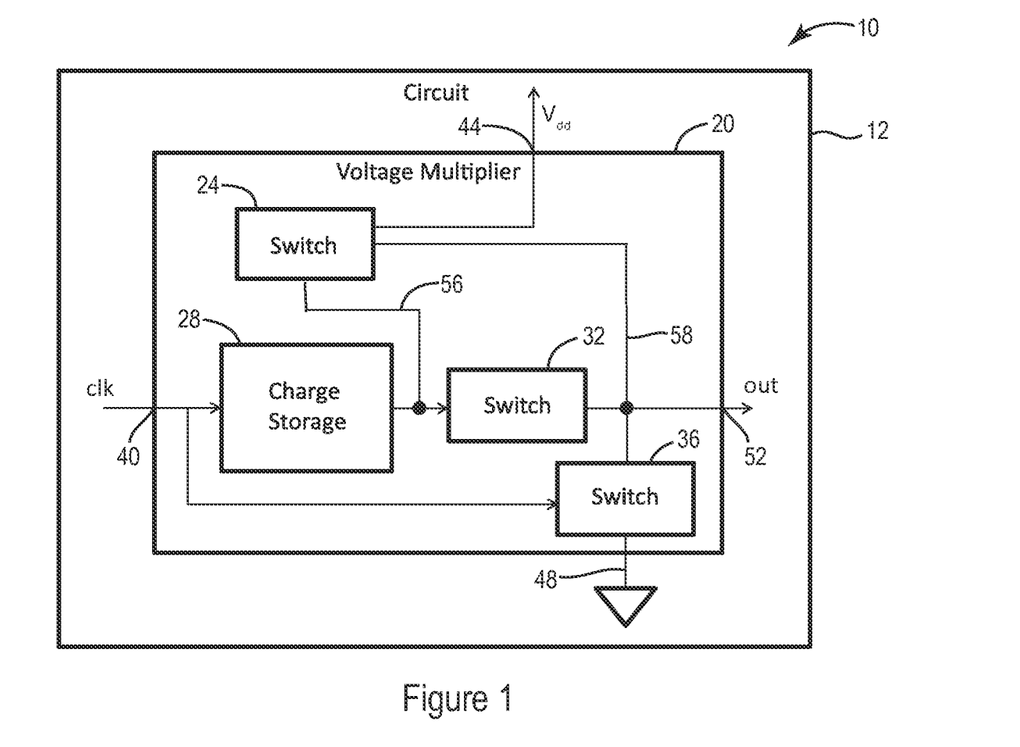
FIG. 1 is a schematic general block diagram depicting an embodiment of a circuit including a voltage multiplier in accordance with one embodiment.

With reference to FIG. 1, a system 10 includes a circuit 12. System 10 can be any type of electronic system or device including a communication, computing, sensing or other device. Circuit 12 can be any part of system 10. In one embodiment, circuit 12 is part of or associated with a power supply in system 10.

In one embodiment, circuit 12 can be a circuit having thick oxide FETs which have threshold voltages that are too large to have adequate gate overdrive using a power supply (e.g., low voltage power supply) intended for thin oxide FETs or core level devices in system 10 or circuit 12. Circuit 12 can include a voltage multiplier circuit 20 that can advantageously provide a larger voltage than available from the power supply such that thick oxide FETs can be utilized in system 10 and/or circuit 12 in one embodiment. Using voltage multiplier circuit 20 provides adequate voltage levels without requiring a larger power supply or an additional power supply.

In one embodiment, circuit 12 includes, is part of or is a precision data converter. In certain embodiments, circuit 12 is part of a charger, a power management unit (PMU) (e.g., for portable devices), a wireless device, a network device, a sensor, a computer, etc. In one embodiment, circuit 12 is a circuit using high $R_{ON}$ to $R_{OFF}$ ratio switches at voltages near midrail of the power supply. The discussion of types of circuit 12 is not provided in a limiting fashion. Circuit 12 can be any type of circuit without departing from the scope of the invention.

In one embodiment, voltage multiplier circuit 20 is part of circuit 12 or associated with circuit 12 or system 10. Voltage multiplier circuit 20 can be integrated with circuit 12 in an integrated circuit process in one embodiment.

Voltage multiplier circuit 20 can be embodied as a voltage doubler and include a switch 24, a switch 32 and a switch 36 in one embodiment. Voltage multiplier circuit 20 provides a voltage level at a voltage output 52 that is more than the voltage level (e.g., V.sub.DD) at a power source or supply node 44 in one embodiment.

Switches 24, 32 and 36 can be three or more terminal devices having a control terminal (e.g., a gate or base) and two other terminals (e.g., a drain and a source or a collector and an emitter) in one embodiment. Switches 24, 32 and 36 can be embodied as transistors, such as N-channel metal oxide semiconductor (NMOS) FETs and/or P-channel metal oxide semiconductors (PMOS) FETs, bipolar junction transistors (BJTs). In one embodiment, switches 24, 32, and 36 are three terminal devices including an additional fourth terminal, such as, a bulk terminal. Although certain types of switches are mentioned, switches 24, 32 and 36 can be embodied as various types of solid state switches and non-solid state (e.g., micro-electromechanical systems (MEMs) switches.

Voltage multiplier circuit 20 also includes an input capacitor or a charge storage element 28. Charge storage element 28 can be any type of device for storing a charge. Element 28 can be a capacitor having a voltage rating and capacitive value in accordance with timing parameters, voltage levels and size requirements. Charge storage element 28 of circuit 12 can be an integrated circuit capacitor or an external capacitor in certain embodiments.

Switch 24 has a first terminal coupled to power supply node 44 and a second terminal coupled to a node 56 in one embodiment. A control terminal of switch 24 is coupled to a node 58 in one embodiment.

Switch 32 has a first terminal coupled to node 56 and a second terminal coupled to node 58 in one embodiment. Switch 32 can have a control terminal coupled to power supply node 44 in one embodiment. The control terminal of switch 32 can be coupled to clock input 40 to receive the clock signal or a derivation of the clock signal in one embodiment.

Switch 36 includes a control input coupled to clock input 40 for receiving the clock signal or a derivation thereof according to one embodiment. Switch 36 includes a first terminal coupled to node 58 and a second terminal coupled to a ground node 48. Charge storage element 28 has a first end coupled to clock input 40 to receive the clock signal or derivation thereof in one embodiment. A second end of charge storage element 28 is coupled to node 56. In one embodiment, charge storage element 28 has a capacitance larger than the load capacitance (e.g., 10 times larger) in one embodiment. A larger capacitance ratio between element 28 and the capacitive load results in larger boosted voltages in one embodiment.

The clock signal at clock input 40 can be a two phase signal (e.g., logic high or low) in one embodiment. The clock signal can be a square wave or pulse signal varying between ground level and approximately V.sub.DD in one embodiment. The clock signal can have a frequency selected for time constants associated with charge storage element 28 and capacitive loads of circuit 12. In one embodiment, the frequency of the clock signal is from 65 kilohertz to 100 megahertz. In one embodiment, the logic high is 1 V, 1.5 V, 2.5 V, 5 V, etc. and the logic low is 0 V or ground level. In one embodiment, the clock signal is selected to effectively settle and charge storage element 28 and transfer the charge to the capacitive load at output 52.

Node 58 is coupled to voltage output 52. In one embodiment, switches 24, 32, and 36 and charge storage element 28 of multiplier circuit 20 cooperate to provide a voltage at voltage output 52 at approximately twice the level of the level of supply voltage ($V_{DD}$) at node 44. Voltage output 52 can be switched or isolated via a diode or other device from the capacitive load.

Voltage multiplier circuit 20 can utilize a voltage doubling scheme that uses charge storage element 28 to double the voltage at node 58 and voltage output 52. In one embodiment, current travels from node 44 through switch 24 to charge storage element 28 at node 56. In one embodiment, charge storage element 28 is charged to approximately the voltage level $V_{DD}$ when the clock signal at clock input 40 is low.

When the clock signal at clock input 40 is high (e.g., $V_{DD}$), switch 36 is non-conducting. When the clock signal at clock input 40 becomes high (e.g., $V_{DD}$) and charge storage element 28 is charged, the voltage at node 56 is increased to approximately 2 $V_{DD}$ (e.g., slightly less than 2 $V_{DD}$, 1.6 $V_{DD}$, 1.7 $V_{DD}$) as switch 24 becomes non-conducting and node 56 is pushed up by the level of approximately $V_{DD}$ by the signal at clock input 40 in one embodiment. Charge sharing by charge storage element 28 with the capacitive load at voltage output 52 can prevent a voltage level of 2 $V_{DD}$ from being reached in one embodiment. As the voltage at node 56 becomes greater than $V_{DD}$, switch 32 becomes conducting and the voltage at node 56 is provided to output 52 in one embodiment. In one embodiment, switch 32 conducts because its control input is coupled to node 44 or the clock signal, depending on circuit configuration. In either configuration, switch 32 conducts when node 56 is above $V_{DD}$ (e.g., approximately 2 $V_{DD}$).

When the clock signal at clock input 40 returns to a low value, switch 36 conducts and node 58 is brought to a ground level. Switch 32 conducts until node 56 is brought to ground level. Switch 32 remains non-conducting until node 56 is above $V_{DD}$ due to the charging of element 28 in one embodiment. Switch 24 conducts and provides current to charge storage element 28 when node 58 is brought to a level below $V_{DD}$. The cycle is repeated as driven by the clock signal in one embodiment.

Switch 24 can be embodied as a thick oxide PMOS FET. Switch 32 can be embodied as a thick oxide PMOS FET. Switch 36 can be embodied as a thick oxide NMOS FET. Switches 24, 32 and 36 can be rated at twice the voltage level of the signal at node 44. In one embodiment, switches 24, 32, and 36 are thin oxide switches.

Figure 2:
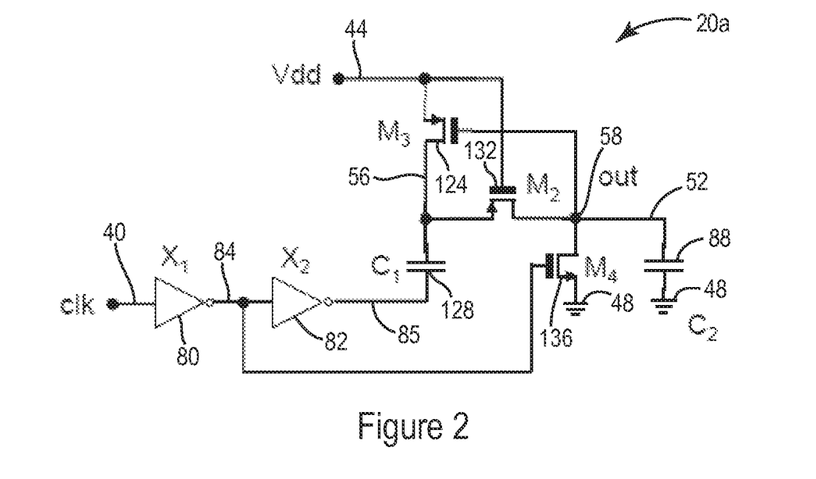
FIG. 2 is an electrical schematic diagram of the voltage multiplier illustrated in FIG. 1 in accordance with an exemplary embodiment.

With reference to FIG. 2, a voltage multiplier circuit 20a can be used as voltage multiplier circuit 20 described with reference to FIG. 1. Voltage multiplier circuit 20a can be embodied as a voltage doubler in one embodiment. In one embodiment, voltage multiplier circuit 20a includes a transistor 124 corresponding to switch 24 in FIG. 1, a transistor 132 corresponding to switch 32 in FIG. 1, and a transistor 136 corresponding to switch 36 in FIG. 1. Voltage multiplier circuit 20a can also include an inverter 80, an inverter 82 and a capacitor 128. Capacitor 128 corresponds to charge storage element 28 in FIG. 1 according to one embodiment. Inverter 80 and inverter 82 can be provided in the series between a node 85 coupled to capacitor 128 and a clock input 40 in one embodiment. In one embodiment, inverter 82 is optional, and node 84 can be connected directly to clock input 40. Capacitor 128 is coupled between nodes 85 and 56. Inverters 80 and 82 can be complementary metal oxide semiconductor (CMOS) inverters configured with a PMOS transistor above an NMOS transistor in one embodiment. Inverter 82 can serve to reduce input capacitance and control input resistance in one embodiment.

A drain of transistor 124 can be coupled to node 56 and a gate of transistor 124 can be coupled to node 58 in one embodiment. A source of transistor 132 can be coupled to node 56 and a drain of transistor 136 can be coupled to voltage output 52 in one embodiment. A drain of transistor 136 can be coupled to voltage output 52, and a source of transistor 136 can be coupled to ground node 48 in one embodiment.

A gate transistor 132 is coupled to node 44 and a gate of transistor 124 is coupled to node 58. A gate of transistor 136 is coupled to node 84.

A capacitive load represented by a capacitor 88 can be provided between voltage output 52 and ground 48. Transistor 136 is driven at its gate by an inverse of the clock signal provided at input 40. Node 85 is driven by an inverted signal of the signal at node 84.

In operation, according to one embodiment, a pulse signal or clock signal from 0-$V_{DD}$ can be provided at clock input 40. When the clock signal at input 40 is ground, transistor 132 is non-conducting and transistor 136 is conducting. In addition, when the clock signal is ground, the signal at node 85 is ground and capacitor 128 is charged up to a voltage level of $V_{DD}$ by current from node 46 traveling through transistor 124 in one embodiment.

When the clock signal is changed to a high voltage level (e.g., $V_{DD}$), transistor 136 no longer conducts. The voltage level at node 56 is pushed up from a level of $V_{DD}$ (capacitor 128 has been charged to level $V_{DD}$) to a level of approximately 2 $V_{DD}$ (e.g., slightly less than 2 $V_{DD}$) in one embodiment. When node 56 reaches a voltage level of approximately 2 $V_{DD}$, transistor 132 becomes conducting in one embodiment. When transistor 132 conducts, a voltage of 2 $V_{DD}$ (neglecting loss) from node 56 is provided at node 58 for the capacitive load represented by capacitor 88.

In one embodiment, the signal swing across transistor 132 is used to modulate the conductance of transistor 132 which achieves a lower voltage drop when compared to two terminal devices. The actions of transistors 124 and 136 force nodes 56 and output 52 to known states in response to the clock signal for more repeatable operation according to one embodiment.

Figure 3:
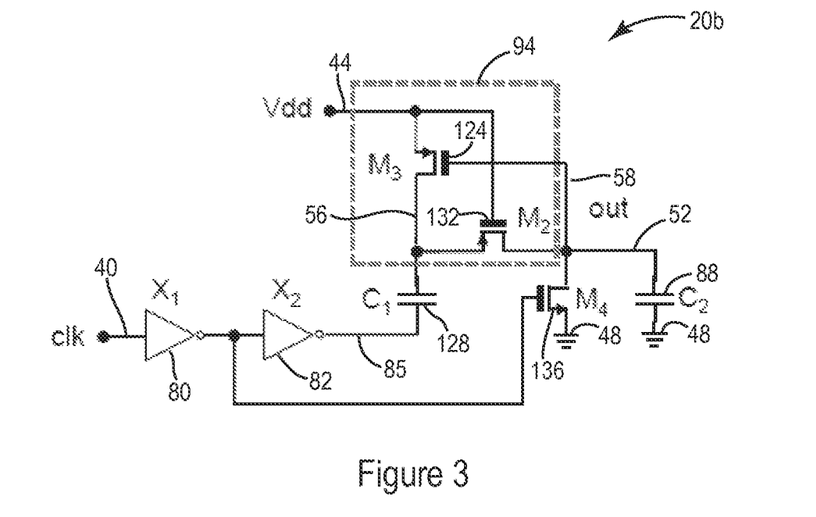
FIG. 3 is an electrical schematic diagram of the voltage multiplier illustrated in FIG. 1 in accordance with another exemplary embodiment.

With reference to FIG. 3, a voltage multiplier circuit 20b illustrated in FIG. 3 is similar to circuit 20a illustrated in FIG. 2. However, circuit 20b in FIG. 3 includes transistors 124 and 132 provided in a well region 94. In one embodiment, well region 94 is configured so that the well regions for transistors 124 and 132 are the same potential. In one embodiment, well region 94 can be a discrete region for transistor 124 and a discrete region for transistor 132, both having the same potential. The voltage at well region affects the threshold voltages of the transistors within the well region. Variations in potentials at the well regions can reduce circuit stability.

In one embodiment, well region 94 can be an N-well region for PMOS transistors, such as transistors 124 and 132. In one embodiment, well region 94 is a floating well region. In another embodiment, a power supply larger than the supply associated with node 44 is provided for well region 94 (e.g., 1.8 V for a VDD=1 V). The power supply provides a voltage high enough to avoid forward biasing source and drain junctions associated with transistors 124 and 132 in one embodiment. In one embodiment, the power supply provides voltage level low enough to avoid electrically over stressing transistors 124 and 132. The use of a common well region 94 for transistors 124 and 132 increases efficiency in one embodiment.

Figure 4:
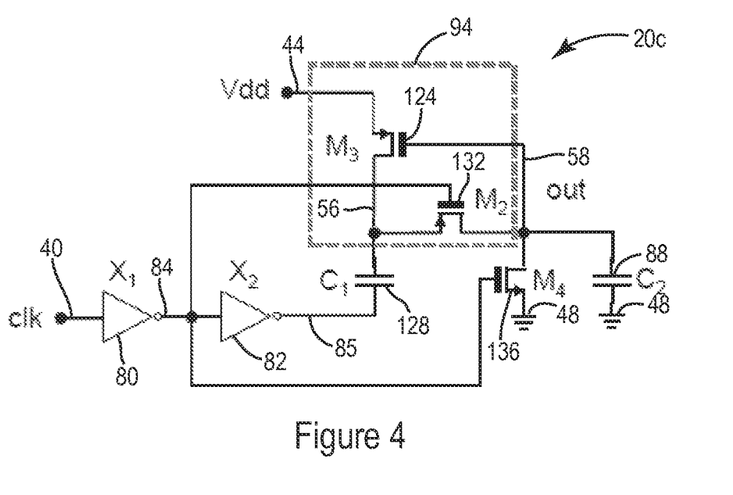
FIG. 4 is an electrical schematic diagram of the voltage multiplier illustrated in FIG. 1 in accordance with another exemplary embodiment.

With reference to FIG. 4, voltage multiplying circuit 20c illustrated in FIG. 4 is similar to voltage multiplying circuit 20b illustrated in FIG. 3. However, a control terminal or gate associated with transistor 132 is coupled to node 84 as opposed to node 44 as shown in FIG. 3. In one embodiment, transistor 132 is driven by an inverse of the clock signal provided at clock input 40 via the gate connection of transistor 132 to node 84. Driving the gate of transistor 32 with the inverted clock signal provides a gate overdrive for transistor 132 with a larger excursion.

Applications have found that simulations of voltage multiplier circuit 20c in FIG. 4 provides a slightly higher peak output voltage with overall behavior very similar to circuits 20a and 20b illustrated in FIGS. 2 and 3, respectively, according to one embodiment. Voltage multiplier circuit 20c can have higher power dissipation as transistor 132 is driven during each cycle in one embodiment. Process parameters and operating frequencies may affect the efficiency and output voltage associated with voltage multiplier circuit 20c illustrated in FIG. 4 in one embodiment.

Figure 5:
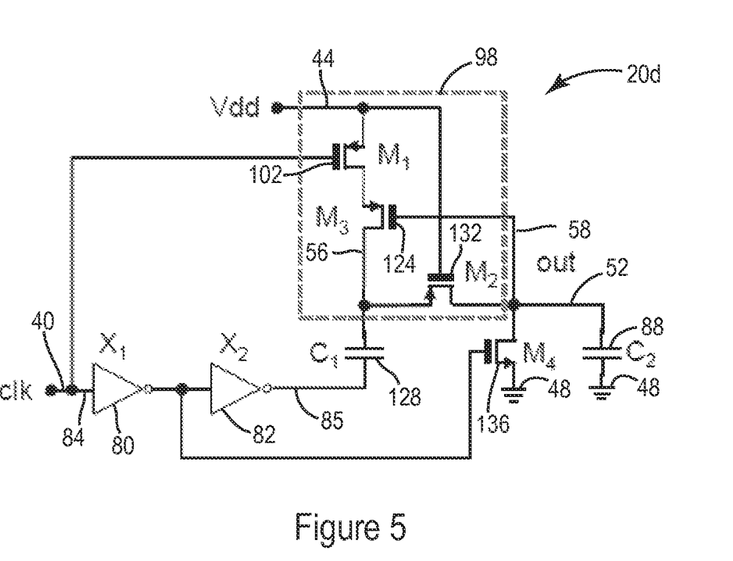
FIG. 5 is an electrical schematic diagram of the voltage multiplier illustrated in FIG. 1 in accordance with another exemplary embodiment.

With reference to FIG. 5, a voltage multiplier circuit 20d is similar to voltage multiplier circuit 20c illustrated in FIG. 3. Voltage multiplier circuit 20d in FIG. 5 includes a well region 98 including a switch or transistor 102 in addition to transistor 124 and transistor 132. Well region 98 can be a floating well region or tied to a potential similar to well region 94 discussed with reference to FIG. 3.

Transistors 102 and 124 are disposed in series between nodes 44 and 56. The position of transistor 102 can be exchanged with transistor 124 in one embodiment. The gate of transistor 102 is coupled to clock input 140 in one embodiment. The gate of transistor 102 can be coupled to node 85 as opposed to clock input 140 in one embodiment. Transistor 102 provides a break before make circuit for circuit 20d in one embodiment. The clock signal from clock input 40 prevents current from traveling through transistor 102 and hence transistor 124 when the clock signal is driven high. This provides a break before make connection between capacitor 128 and node 44 which reduces charge loss from capacitor 128 due to a brief period of unwanted conduction of transistor 124 due to the bias of $V_{DD}$ across transistor 124 when node 56 is raised to approximately 2 $V_{DD}$. In one embodiment, inverters 80 and 82 provide a slight delay (e.g., 10 to 20 picoseconds) with respect to the signal at node 85 so that transistor 102 is biased for non-conduction before node 56 is raised to voltage level 2 $V_{DD}$ in one embodiment.

In one embodiment, voltage multiplier circuit 20d can have transistor 132 with its gate connected to node 84 as shown in FIG. 4 as opposed to node 44 as shown in FIG. 5. Such an embodiment can provide a slightly higher peak output voltage with overall behavior similar to circuits 20a and b illustrated in FIGS. 2 and 3.

Transistor 102 can be a PMOS transistor. In one embodiment, transistor 102 is a thick oxide PMOS FET. Transistor 102 can have a source coupled to node 44, and a drain coupled to a source of transistor 124. As shown in FIG. 5, the source of transistor 124 is not coupled to node 44 as shown in FIG. 4.

Figure 6:
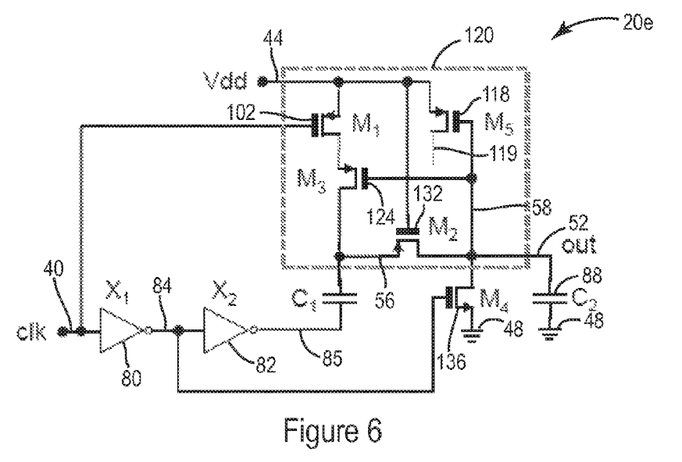
FIG. 6 is an electrical schematic diagram of the voltage multiplier illustrated in FIG. 1 in accordance with another exemplary embodiment.

With reference to FIG. 6, a voltage multiplier circuit 20e in FIG. 6 is similar to voltage multiplier circuit 20d illustrated in FIG. 5. However, voltage multiplier circuit 20e includes a transistor 118 coupled within a well region 120. Transistors 102, 124 and 132 can share well region 120 with transistor 118 in one embodiment. Transistor 118 can be a thick oxide PMOS transistor in one embodiment.

Well region 120 can be driven via a drain of transistor 118. Transistor 118 includes a source coupled to node 44 and a drain coupled to node 119 in well region 120. Transistor 118 provides greater control of well region 120 than floating well regions. N well cycle potentials can vary from one cycle to another causing cycle to cycle variation in the output waveform. Transistor 118 can control N well potential so that the operation on every rise/fall cycle is closer to identical.

Alternatively, a secondary supply can be utilized in circuits 20a-e. The secondary supply is configured for the appropriate voltage range and sufficiently clean output for the application in one embodiment. The secondary source can be physically distributed in circuit 12 (FIG. 1) in one embodiment.

Voltage multiplier circuit 20e can provide particular advantages in circuits that do not tolerate voltage variations at output 52. Voltage multiplier circuit 20e is able to achieve steady state operation in less clock cycles than other voltage doublers according to one embodiment. The time for reaching steady state creates variation in the voltage level at output 52. According to one application, such as an analog-to-digital converter application, a failure to achieve steady state at output 52 can cause several least significant bits (LSB) of error or would require additional latency in the converter.

Voltage multiplying circuit 20e can be provided with transistor 132 having its gate coupled to node 40 as opposed to node 44. In addition, gate of transistor 102 can be driven by node 85. In certain embodiments, transistor 118 is used in well regions 94 and 98 discussed with reference to FIGS. 3-5.

Figure 7:
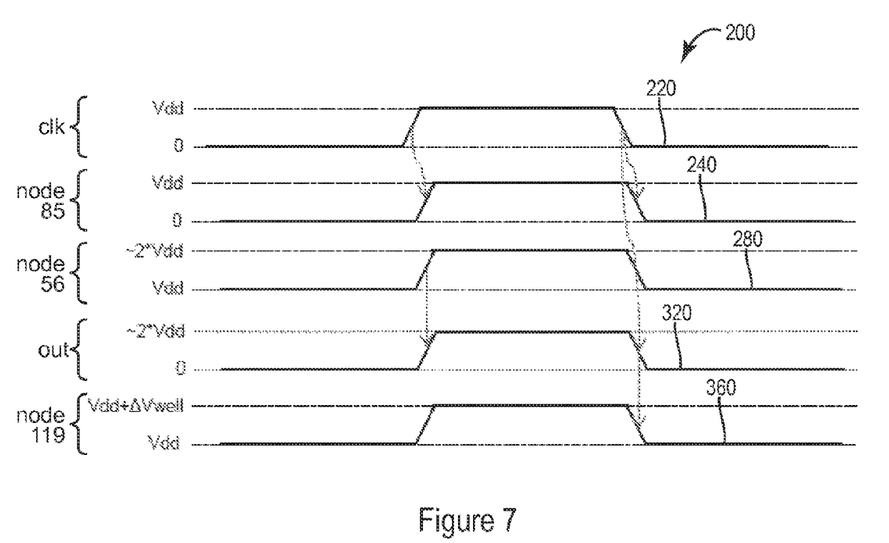
FIG. 7 is a timing diagram illustrating signals used in the voltage multiplier illustrated in FIG. 6 in accordance with another exemplary embodiment.

With reference to FIG. 7, a waveform diagram 200 includes a clock signal 220 at node 40, a signal 240 at node 85, a signal 280 at node 56, a signal 320 at output 52, and a signal 360 for node 119 of well region 120. Signals 220 and 240 vary from 0-$V_{DD}$ voltage level. Signal 280 varies from the $V_{DD}$ voltage level to approximately 2 $V_{DD}$ voltage level and signal 320 varies from 0 to the approximately 2 $V_{DD}$ voltage level. Signal 360 varies from a voltage level of $V_{DD}$ to approximately $V_{DD}$+V$\Delta$subwell. Signals 240, 280, 320 and 360 lag signal 220 slightly. Signals 280, 320, 360 lag signal 240 slightly. Signals 220, 240, 280, 320 and 360 are shown for voltage multiplier circuit 20e. Circuits 20a-d can operate according to similar timing diagrams adjusted for circuit differences with respect to circuit 20e.

The value $V_{DD}$+V$\Delta$subwell is a voltage level provided by transistor 118 and corresponds to the voltage at node 58 minus a diode drop in one embodiment. Without transistor 118, circuit 20e with a floating well region 94 has a signal 360 that starts at a first voltage level (e.g., $V_{DD}$) and ramps up to approximately 2 $V_{DD}$ minus a diode drop after a number of clock pulses.

In certain embodiments, voltage multiplier circuits 20a-e can be provided in 0.13 micron technology. Circuits 20a-e can be fabricated in a CMOS process and provided an integrated circuit in one embodiment.

It should be noted that certain passages of this disclosure can reference terms such as "first" and "second" in connection with devices for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either an integrated circuit or, in some embodiments, on multiple circuits, circuit boards or discrete components. In addition, the systems and methods described above can be adjusted for various system parameters and design criteria, such as output voltage level, power requirements, power supply levels, etc. Although shown in the drawings with certain components directly coupled to each other, direct coupling is not shown in a limiting fashion and is exemplarily shown. Alternative embodiments include circuits with indirect coupling between the components shown. Alternative embodiments can drive certain components with signals that are buffered, amplified, inverted, etc. with respect to the signals described herein.

While the foregoing written description of the methods and systems enables one of ordinary skill to make and use what is considered presently to be the best-mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A voltage multiplier circuit, comprising:
    a storage element having a first end and a second end, the second end being in communication with a clock signal input;
    a first transistor having a gate coupled to a voltage output, a first terminal coupled to a supply node, and a second terminal coupled to the first end of the storage element;
    a second transistor having a gate continuously coupled to the supply node, a first terminal coupled to the first end of the storage element, and a second terminal coupled to the voltage output; and
    a third transistor having a gate in communication with the clock signal input, a first terminal coupled to the voltage output.

2. The voltage multiplier circuit of claim 1, wherein the gate of the third transistor is coupled to the clock input through a first inverter.

3. The voltage multiplier circuit of claim 1, wherein the second end of the storage element is coupled to the clock input through a first inverter and a second inverter.

4. The voltage multiplier circuit of claim 1, wherein the first transistor and the second transistor share a well or are disposed in separate wells having the same bias.

5. The voltage multiplier circuit of claim 1, wherein the first transistor, and the second transistor, share a well driven by a fourth transistor having a gate coupled to the voltage node.

6. The voltage multiplier circuit of 5 wherein the first, second and fourth transistors are PMOS transistors.

7. The voltage multiplier circuit of claim 1, further comprising:
    a fourth transistor having a gate coupled to the clock input, a first terminal coupled to the supply node, wherein the first terminal of the first transistor is coupled to the supply node through the first terminal of the fourth transistor and a second terminal of the fourth transistor.

8. The voltage multiplier circuit of claim 1, wherein the second transistor has a gate coupled to the clock input.

9. A method of increasing a voltage level, comprising:
    charging a capacitor having a first end coupled to a first node and raising a voltage a second end of the capacitor to provide a voltage level at the first node above a supply node;
    providing current from the capacitor through a first transistor to a voltage output;
    preventing the current from the capacitor from traveling through the first transistor, the first transistor having a gate continuously coupled to the supply node; and
    providing current through a second transistor having a first terminal coupled to the supply node to charge the capacitor.

10. The method of claim 9, wherein the second end of the capacitor is coupled to the first node, the second transistor is coupled between the supply node and the first node, and the first transistor has a gate coupled to the supply node.

11. The method of claim 10 further comprising:
    preventing current through the second transistor responsive to providing current from the capacitor to the voltage output.

12. The method of claim 11, wherein a clock signal controls the second transistor.

13. The method of claim 9 further comprising:
    controlling a well bias of the first transistor responsive to a voltage level at the voltage output.

14. The method of claim 9, further comprising:
    bringing the voltage output to ground via a third transistor responsive to charging the capacitor.

15. A voltage doubler, comprising:
    a storage capacitor disposed between a clock input and a first node;

a first switch disposed between a supply node and the first node, the first switch having a control terminal in communication with a voltage output;

a second switch disposed between the first node and the voltage output, the second switch having a control terminal continuously in communication with the supply node; and a third switch disposed between the control input of the first switch and a ground node.

16. The voltage doubler of claim 15, wherein a control input of the third switch is coupled to the clock input through a first inverter.

17. The voltage doubler of claim 15, wherein the first switch and the second switch share a well or are disposed in separate wells having the same bias.

18. The voltage doubler of claim 15, wherein the first switch and the second switch share a well driven by a fourth switch having a control input coupled to the voltage output.

19. The voltage doubler of claim 15, further comprising:

a fourth switch disposed between the first node and the supply node and having a control input coupled to the clock input.

20. A voltage multiplier circuit, comprising:

a storage element having a first end and a second end, the second end being in communication with a clock signal input;

a first transistor having a gate coupled to a voltage output, a first terminal coupled to a supply node, and a second terminal coupled to the first end of the storage element;

a second transistor a first terminal coupled to the first end of the storage element, and a second terminal coupled to the voltage output;

a third transistor having a gate in communication with the clock signal input, a first terminal coupled to the voltage output; and a fourth transistor having a gate coupled to the clock input, a first terminal coupled to the supply node, wherein the first terminal of the first transistor is coupled to the supply node through the first terminal of the fourth transistor and a second terminal of the fourth transistor.

* * * * *